United States Patent [19]

Carolan

[11] 4,244,160
[45] Jan. 13, 1981

[54] IGNITION INTERLOCK SYSTEM FOR SELF-PROPELLED WALK-BEHIND LAWN MOWER

[75] Inventor: Donald L. Carolan, Beaver Dam, Wis.

[73] Assignee: Deere & Company, Moline, Ill.

[21] Appl. No.: 972,143

[22] Filed: Dec. 21, 1978

[51] Int. Cl.³ .................................. A01D 35/26
[52] U.S. Cl. ................... 56/10.5; 56/17.4; 56/202
[58] Field of Search ............. 56/17.4, 10.5, 320.2, 56/17.5, 202, 255

[56] References Cited
U.S. PATENT DOCUMENTS

| 3,568,421 | 3/1971 | Smith et al. | 56/17.4 |
| 3,750,378 | 8/1973 | Thorud et al. | 56/17.4 |
| 3,969,875 | 7/1976 | Nofel | 56/10.5 |
| 4,043,102 | 8/1977 | Uhlinger et al. | 56/17.4 |

Primary Examiner—Jay N. Eskovitz

[57] ABSTRACT

A self-propelled, walk-behind mower includes a mower blade housing provided with a discharge opening. The mower is selectively readied for operating in mulching, side discharging or bagging modes by respectively securing a cover, side discharge chute or bagging chute over the discharge opening. An electrical ignition interlock system is provided for preventing operation of the engine in the absence of the cover or one of the chutes being properly secured over the opening, the interlock further requiring a material-receiving bag to be secured in material-receiving relationship to a discharge opening of the bagging chute when the latter is installed on the mower.

6 Claims, 9 Drawing Figures

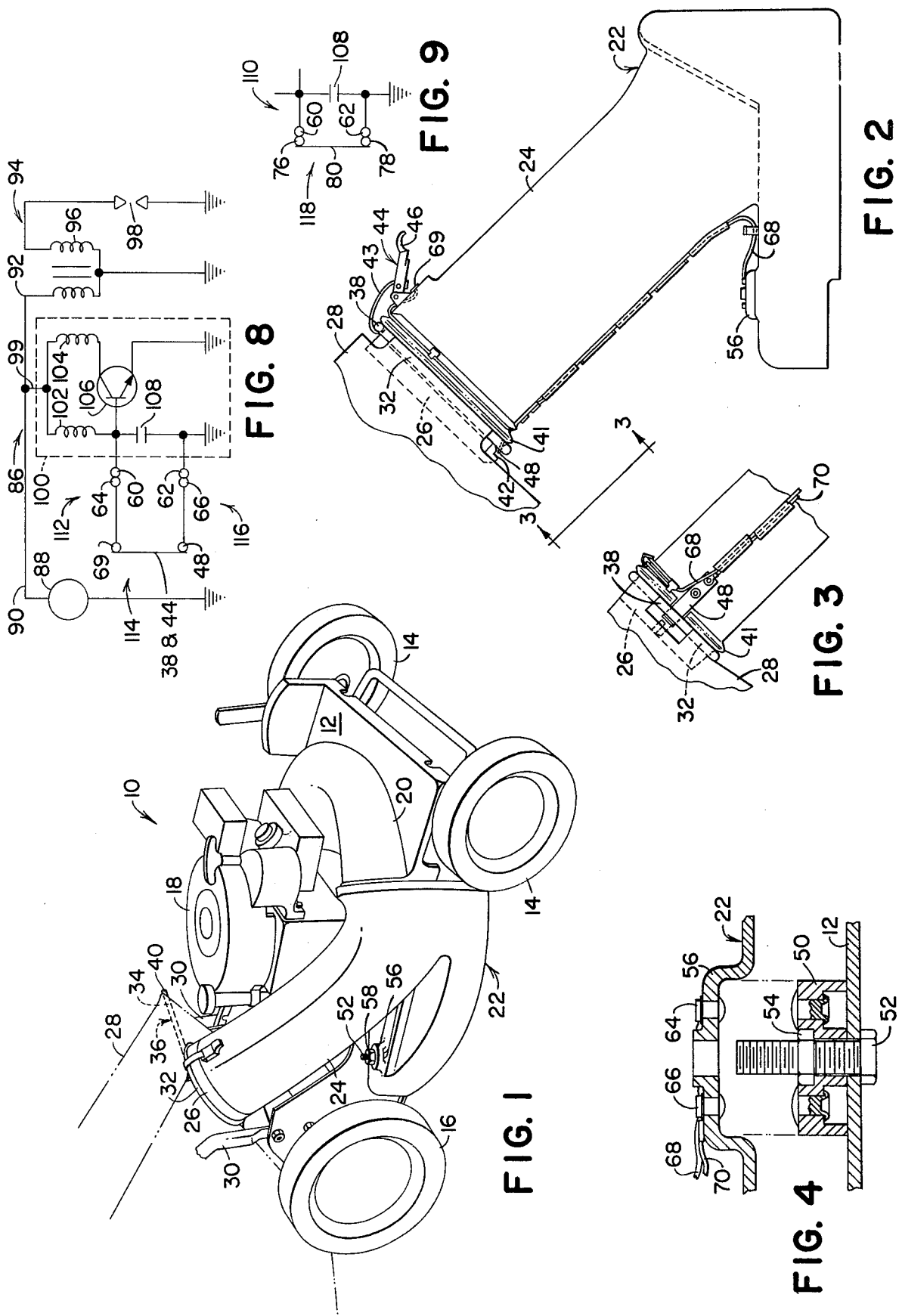

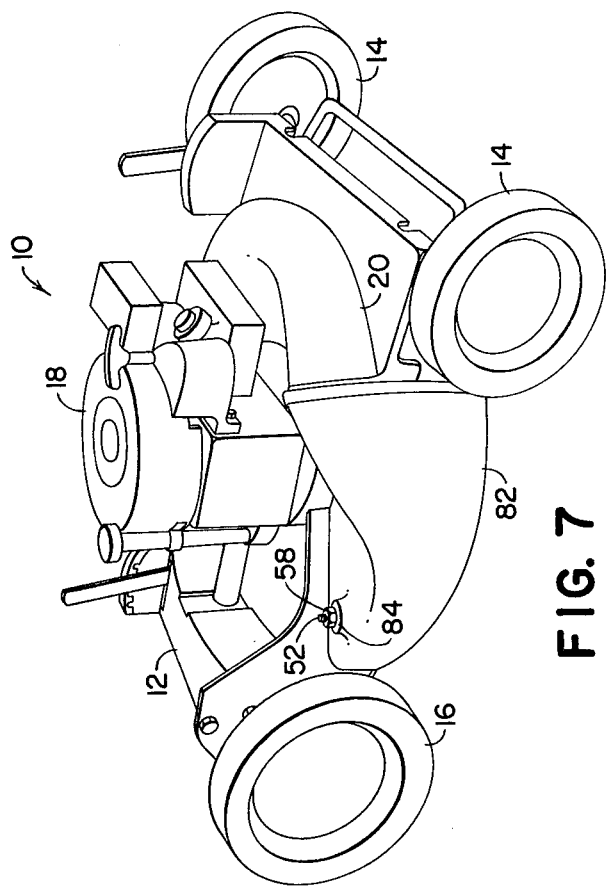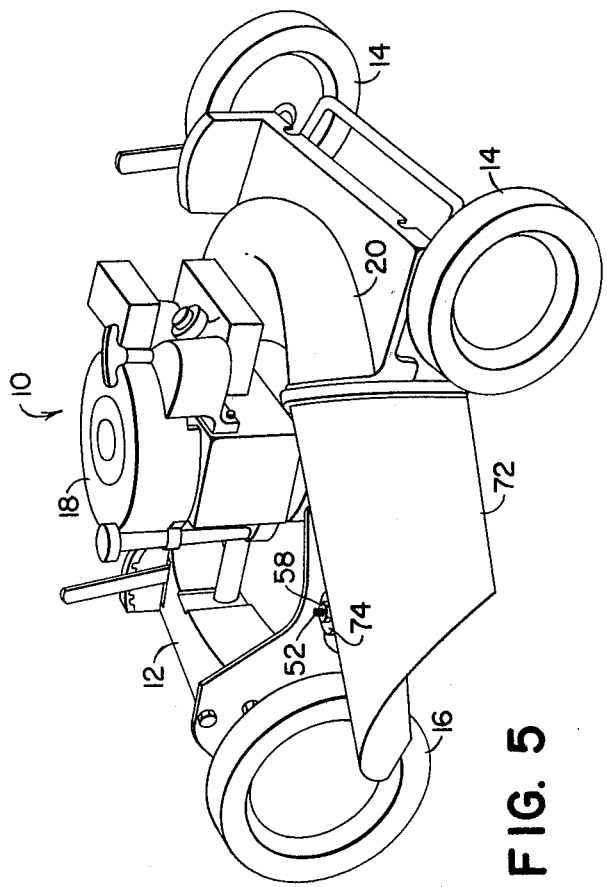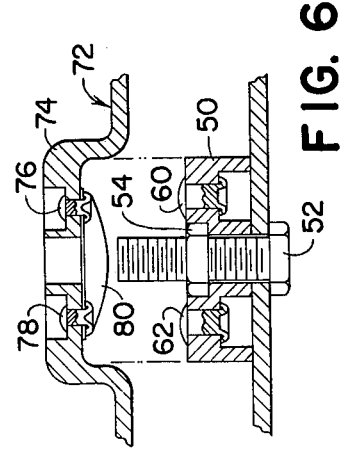

IGNITION INTERLOCK SYSTEM FOR SELF-PROPELLED WALK-BEHIND LAWN MOWER

BACKGROUND OF THE INVENTION

The present invention relates to safety interlock systems for lawn mowers and more particularly relates to electrical ignition interlock systems for walk-behind lawn mowers.

Walk-behind lawn mowers normally include a blade housing having a discharge opening, which may be closed by a door for mulching operation or which may have discharge or bagging chutes inserted therein respectively, when it is desired to direct material onto the ground before it recirculates through the housing or when it is desired to direct material to a bag mounted to receive material impelled through the bagging chute.

In order to ensure that the mower will not be operated without the discharge opening being closed by a door or cover or without some sort of chute being associated with the opening, some known designs have included a door pivotally mounted on the housing along one edge of the opening and spring biased toward a closed position over the opening. Also provided is an electrical ignition interlock system including a normally closed kill switch which grounds out the engine ignition. The kill switch is located such that it is held open either by the door when the latter is closed or by the bagging attachment when the latter is in place. U.S. Pat. No. 4,043,102 issued to Uhlinger et al on Aug. 23, 1977 discloses a mower design of the type just described.

One disadvantage of electrical ignition interlock systems of the aforedescribed type is that the switch may somehow stick in the open position which would permit operation of the mower with the discharge opening uncovered and disassociated with any type of chute.

SUMMARY OF THE INVENTION

According to the present invention, there is provided a novel electrical ignition interlock system for a walk-behind mower.

An object of the invention is to provide an electrical ignition interlock system including a grounding circuit which is definitely completed anytime a covering door, or a side discharge chute or a bagging chute is absent.

A further object of the invention is to provide a mower, as set forth in the previous object, but further including a collecting bag for attachment to the bagging chute in material-receiving relationship thereto, the grounding circuit being definitely completed unless both the bagging chute and the material collecting bag are porperly installed.

A more specific object is to provide a lawn mower with an electrical ignition interlock system as aforedescribed wherein the circuitry includes contacts carried by each of the blade housing, door, a side discharge chute, a bagging chute and a collecting bag, and contacts of the door and side discharge chute respectively being required to be in contact with those of the housing in order to disrupt the ignition grounding circuit and the bagging chute having a first set of contacts required to be in contact with those of the housing and a second set of contacts required to be in contact with those of the collecting bag in order to disrupt the ignition grounding circuit.

These and other objects will become apparent from reading the ensuing description together with the appended drawings.

BRIEF DESCRIPTION OF THE DRAWINGS

FIG. 1 is a right front perspective view of a lawn mower constructed in accordance with the present invention and shown in a bagging mode.

FIG. 2 is a right side elevational view of the bagging chute and that portion of the collecting bag which is secured to the chute.

FIG. 3 is a view, taken along the line 3—3 in FIG. 2.

FIG. 4 is an exploded vertical sectional view showing the connection between the electrical contacts carried by the bagging chute and those carried by the blade housing.

FIG. 5 is a view similar to that of FIG. 1 but showing the mower in a side discharge mode.

FIG. 6 is a view similar to that of FIG. 4 but showing the connection between the electrical contacts carried by the side discharge chute and those carried by the housing.

FIG. 7 is a view similar to those of FIGS. 1 and 5 but showing the mower in a mulching mode.

FIG. 8 is a schematic representation of the electrical ignition circuit as is formed when a bagging chute and bag are installed on the mower.

FIG. 9 is a schematic representation of a modification of part of the circuit illustrated in FIG. 8 as is formed when a side discharge chute or a cover is installed on the mower.

DESCRIPTION OF THE PREFERRED EMBODIMENT

Referring now to FIG. 1, therein is shown a lawn mower 10 including a blade housing 12 supported at front and rear end portions thereof by front and rear sets of ground wheels 14 and 16. An internal combustion engine 18 is mounted on a central portion of the housing 12 and includes a vertical output shaft (not shown) to which a cutting blade is fixed for sweeping a circular path. Except for an opening (not shown) located at the right side of the mower between the sets of wheels 14 and 16 and being generally in the shape of a circular segment as considered in top plan view, the housing extends above and circumferentially about the path swept by the blade. The top of the housing 12 is formed to define a clipping guide channel 20 which gradually increases in height from a location at the rear of the housing to a discharge opening at the opening in the housing.

Shaped and disposed in covering relationship to the opening in the housing and in clipping-receiving relationship to the discharge opening of the channel 20 is a bagging chute 22 having an upwardly and rearwardly inclined clipping conveying duct 24 having an upper end portion 26 inserted in an entrance located in an upper right-hand corner of a box-shaped bag or container 28 mounted between opposite legs 30 of a rearwardly and upwardly inclined mower guide handle.

Referring now also to FIGS. 2 and 3, it can be seen that the bag 28 is sewn to form a first loop portion 32, which circumscribes the entrance, and a second loop portion 34, which extends along an upper front corner of the bag. A metal rod 36 is provided for supporting the forward end of the bag from the upper end portion 26 of the duct 24 and for that purpose includes an oval-shaped right end portion 38 threaded through the first loop portion 32 and a straight transverse portion 40 threaded through the second loop portion 34 of the bag 28. The first loop portion 32 includes upper and lower cut-out sections which expose sections of the oval-shaped right end portion 38 of the rod 36. Fixed to the upper end portion 26 of the duct 24 for holding the rod in place between a rib 41 extending about the duct 24 and a projection 42 adjacent the lower cut-out section of the first bag loop portion 32 is a spring metal latch clip 43 of a metal latch 44 engaged with the rod section at the upper cut-out and connected to a toggle lever 46 for operation thereby. A metal strip 48 engages the exposed rod section at the lower cut-out section of the loop portion 32 and the rod is biased against the strap 48 through the action of the latch clip 43.

Referring now also to FIG. 4, it can be seen the housing 12 has a cylindrical member 50 secured thereto by means of a threaded bolt 52 received in aligned holes provided in a horizontal portion of the housing, adjacent the opening therein, and provided centrally in the member 50. A first nut 54 is received on the bolt 52 and secures the cylindrical member 50 against the housing. The bagging chute 22 includes a generally horizontal portion formed to define a receptacle 56 shaped complementary to the cylindrical member 50 and having the latter received therein. A second nut 58 is received on the bolt 52 and secures the chute 22 in place on the member 50.

For a purpose to be more fully explained below, the cylindrical member 50 carries a pair of spaced rivets which form electrical contacts 60 and 62 while the bagging chute 22 has a pair of similarly spaced rivets located in the receptacle 56 and forming a pair of electrical contacts 64 and 66 which are respectively engaged with the contacts 60 and 62 when the bagging chute is secured in place over the opening in the housing 12. Secured to the contact 64 is a lead 68 which is supported against and extends along the underside of the duct 24 of the chute 22, the lead 68 having an upper end portion which is supported against and extends around the duct to and terminates in a contact 69 formed by a rivet fixed to the duct and located for being selectively engaged by the latch lever 46 when the latch 44 is latched. Similarly, a lead 70 is fixed to the contact 66 and is supported against and extends along the underside of the duct 24 and has an upper end fixed to the metal strap 48.

Referring now to FIGS. 5 and 6, the mower 10 is shown in a side discharge mode wherein a side discharge chute 72 is secured to the housing 12 over the opening in the latter, the chute 72 being disposed to receive clippings from the guide channel 20 of the housing 12 and shaped to continue the channeling of clippings and to distribute them over the ground at the right side of the mower. Like the bagging chute 22 described above, the side discharge chute 72 is provided with a receptacle 74 shaped complementary to and receiving the cylindrical member 50 with the second nut 58 being received on the bolt 52 to aid in holding the chute 72 in place. As can best be seen in FIG. 6, a pair of spaced rivets are fixed to the chute 72 in the receptacle 74 and form electrical contacts 76 and 78 which are connected together by a Belleville washer 80 operative to be tightened into engagement with the contacts 60 and 62 by means of the nut 58.

Referring now to FIG. 7, therein the mower 10 is shown in a mulching mode wherein a mulching cover 82 is secured to the housing 12 to completely cover the opening therein. Like the bagging and side discharge chutes described above, the cover 82 includes a receptacle 84 shaped complementary to and receiving the cylindrical member 50. The details of the receptacle 84 are exactly the same as those of the aforedescribed receptacle 74 of the side discharge chute 72 and, for the sake of brevity, no further description thereof appears herein.

Referring now to FIG. 8, therein is schematically shown an electrical ignition interlock system 86 corresponding to that formed when the bagging chute 22 and bag 28 are installed. Specifically, the system 86 includes an electrical current source 88 which may be of a contactless capacitor discharge type which generates a unidirectional, periodic pulse. The source 88 is coupled, by means of a lead 90, to a primary winding 92 of an ignition coil 94 having a secondary winding 96 coupled to a spark plug 98. Connected to the lead 90 by a lead 99 is a control circuit 100 including a pair of resistors 102 and 104 connected in parallel with each other, the resistance value of the resistor 102 being significantly larger than that of the resistor 104. The resistor 102 is connected to the base of a transistor 106 while the resistor 104 is connected to the collector of the transistor. The emitter of the transistor 106 is connected to ground. Located between the resistor 102 and ground is a capacitor 108. A mower-condition sensing circuit 110 is connected across the capacitor 108 and includes a first connection 112 comprising the contacts 60 and 64, a switch 14 comprising the metal strap 48 as one contact and the contact 69 as another contact and a bridging element, formed by a combination of the rod portion 38 and latch 44, and a second connection 116 comprising the contacts 62 and 66.

Referring to FIG. 9, therein is shown the mower-condition sensing circuit 110 as formed when the mower is in either of its side discharge or mulching modes. Specifically, the circuit 110 includes a switch 118 comprising the contacts 60 and 62 and the washer 80 and contacts 76 and 78 as a conducting means connecting the contacts 60 and 62 when either the chute 72 or cover 82 is in place.

The operation of the ignition interlock system 86 is as follows. Assuming that the opening in the mower housing 12 is left uncovered and has no chute associated therewith, the contacts 60 and 62 of the sensing circuit 110 will not be connected in any manner for transferring current therebetween. Consequently, if the mower engine 18 is cranked, a current sufficient to turn on the transistor 106 will occur at the base and the source 88 will be connected to ground via the collector and emitter of the transistor to thus ground out the ignition current.

If the bagging chute 22 is then mounted on the housing 12 in material-receiving relationship to the opening in the housing, the receptacle 56 of the bagging chute 22 is secured in position on the cylindrical member 50 to thus engage the contact 60 with the contact 64 and to engage the contact 62 with the contact 66. Since at this time the bag 28 has not yet been connected to the bagging chute 22, no conductor element will be present to conduct current between the contacts defined by the contact 69 and metal strap 48. Accordingly, if the engine 18 is cranked, the ignition current will be connected to ground by the control circuit 100 in the same manner just described.

Upon the bag 28 being connected to the upper end portion 26 of the duct 24, the latch 44 and the metal strap 48 will be engaged with the metal rod portion 38 and the latch lever 46 will be engaged with the contact 69 to thus complete the sensing circuit across the capacitor 108. Cranking of the engine 18 will now result in current being generated by the source 88. That portion of this current which passes through the resistor 102 will bypass the capacitor 108 and go to ground. Consequently, the transistor 106 will not be switched on and the remaining portion of the generated current will pass on to the ignition coil 94 and finally to the spark plug 98.

If instead of the bagging chute and bag being installed on the mower 10, one or the other of the side discharge chute 72 or cover 82 is installed on the mower, the system 86 will operate just as before, however, the sensing circuit 110 is now completed by means of the contacts 76 and 78 and the washer 80.

Of course, it wil be appreciated that removal of either the bag 28, the chutes 22 or 72, or the cover 82 while the mower engine is running will immediately result in the ignition current being grounded and hence in the stopping of the engine.

I claim:

1. A walk-behind mower and engine ignition safety interlock system, comprising: a blade housing provided with a discharge opening and an upwardly projecting boss adjacent to the opening; a cutting confining means disposed in covering relationship to the discharge opening for at least intercepting cuttings following an upward trajectory toward the opening; said cutting confining means including a receptacle shaped complementary to and receiving said boss; releasable fastener means extending centrally through the boss and receptacle and releasably securing the cutting confining means to the housing; an internal combustion engine mounted on the housing and including an engine ignition means; an ignition circuit connected to the ignition means and including a current source and a normally closed switch means connected in series with and between the current source and the ignition means; said switch means including a first pair of separate contacts mounted in the boss; and conductor means mounted at least partly in said receptacle for interconnecting the first pair of contacts for effecting the normally closed condition of the switch means only when the cutting confining means is secured to the housing.

2. The mower defined in claim 1 wherein the cutting confining means is a mulching attachment which blocks the discharge opening such as to prevent the flow of clippings therethrough; and said conductor means is a spring washer disposed in the receptacle in engagement with the first pair of contacts.

3. The mower defined in claim 1 wherein the cutting confining means is a side discharge chute and said conductor means is a spring washer disposed in the receptacle in engagement with the first pair of contacts.

4. The mower defined in claim 1 wherein the cutting confining means is defined by the combination of a bagging chute and bag and second releasable fastener means connecting the bag in material-receiving relationship to the bagging chute; and said conductor means including a second pair of spaced contacts mounted in the receptacle respectively in contact with the first pair of contacts; first and second leads respectively connected to the second pair of contacts; said second releasable fastener means including a clip and a latch made of electrically conductive material and being fixed to the bagging chute; and clip being fixed to the first lead; and a length of electrically conductive material fixed to the bag and engaged by the clip and latch; a contact fixed to the chute adjacent to the latch; said latch including a latch lever movable to a latched position wherein it engages said last mentioned contact whereby said normally closed condition of the switch means is effected only when the bag is mounted on the bagging chute.

5. In a walk-behind mower including a blade housing provided with a discharge opening, a tubular chute fixed to the housing in cutting-receiving relationship to the discharge opening, a collecting bag connected to the tubular chute for receiving cuttings conveyed thereby, an internal combustion engine for driving a cutting blade of the mower and an ignition circuit connecting a current source to an engine ignition means, the improvement of a safety interlock embodied in the ignition circuit, comprising: a normally open grounding circuit means connected in series between the source and ignition means and including a mower-condition sensing circuit including first and second pairs of contacts respectively fixed to the housing and chute and being held in contact with each other only when the chute is secured to the housing; said chute having a generally cylindrical discharge end and the bag having a generally circular opening disposed over the discharge end of the chute; said conductor element including a support rod fixed to the bag about said generally circular opening and also received on the discharge end of the chute; a third pair of contacts carried by the chute adjacent the discharge end thereof and respectively forming part of a first releasable fastening clip engaged with the rod and a contact engaged by a second releasable fastening clip engaged with the rod; first and second electrical leads respectively connecting the second pair of contacts to the third pair of contacts and an electrical conductor element in the form of a support rod fixed to the bag about said circular opening and completing an electrical connection between the third pair of contacts to effect the normally open condition of the grounding circuit means only when the collecting bag is secured to the chute.

6. The mower defined in claim 5 wherein the housing includes a vertically projecting boss located adjacent to the discharge opening; said chute having a receptacle-shaped complementary to and receiving said boss; said first pair of contacts being fixed in the boss and said second pair of contacts being fixed in the receptacle; and a fastener means extending centrally through the boss and receptacle and aiding in releasably securing the chute on the housing and in maintaining the first and second pairs of contacts in engagement with each other.

* * * * *

UNITED STATES PATENT OFFICE
CERTIFICATE OF CORRECTION

Patent No. 4,244,160　　　　　　　　　Dated　13 January 1981

Inventor(s) Donald L. Carolan

It is certified that error appears in the above-identified patent and that said Letters Patent are hereby corrected as shown below:

Column 6, line 7, delete "and" first occurance and insert -- the --.

Signed and Sealed this

Twenty-eighth Day of April 1981

[SEAL]

Attest:

RENE D. TEGTMEYER

Attesting Officer　　　Acting Commissioner of Patents and Trademarks